(12) United States Patent
Beerwerth et al.

(10) Patent No.: US 6,203,194 B1
(45) Date of Patent: Mar. 20, 2001

(54) THERMOPILE SENSOR FOR RADIATION THERMOMETER OR MOTION DETECTOR

(75) Inventors: Frank Beerwerth, Runkel-Ennerich; Bernhard Kraus, Braunfels, both of (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 09/180,811

(22) PCT Filed: Mar. 5, 1998

(86) PCT No.: PCT/EP98/01247

§ 371 Date: Nov. 16, 1998

§ 102(e) Date: Nov. 16, 1998

(87) PCT Pub. No.: WO98/41828

PCT Pub. Date: Sep. 24, 1998

(30) Foreign Application Priority Data

Mar. 15, 1997 (DE) .............................. 197 10 946

(51) Int. Cl.[7] .................. G01J 5/12; H01L 35/04
(52) U.S. Cl. .................. 374/133; 374/132; 374/181; 136/227; 136/230; 250/338.1
(58) Field of Search ..................... 374/133, 126, 374/129, 208, 338.1, 132, 181, 182; 136/230, 227; 250/338.1, 336.1

(56) References Cited

U.S. PATENT DOCUMENTS

| 2,627,530 | 2/1953 | Fastie . | |
|---|---|---|---|
| 4,257,822 | * 3/1981 | Gomez | 136/227 |
| 4,456,919 | 6/1984 | Tomita et al. . | |
| 4,722,612 | 2/1988 | Junkert . | |
| 5,011,543 | * 4/1991 | Yokoi | 136/230 |
| 5,045,123 | * 9/1991 | Hattori et al. | 136/230 |
| 5,056,929 | * 10/1991 | Watanabe et al. | 136/230 |
| 5,141,330 | 8/1992 | Greporty . | |
| 5,229,612 | * 7/1993 | Pompei et al. | 374/126 |
| 5,689,087 | * 11/1997 | Jack | 136/230 |
| 5,695,283 | 12/1997 | Johnson . | |
| 5,813,764 | * 9/1998 | Hendrik et al. | 374/10 |
| 5,824,947 | * 10/1998 | Marcris | 136/230 |

FOREIGN PATENT DOCUMENTS

| 865990 | 8/1949 | (DD) . |
| 41 02 524 | 1/1991 | (DE) . |
| 37 07 631 | 3/1997 | (DE) . |
| 751758 | 7/1956 | (GB) . |
| 64-231747 | 9/1989 | (JP) . |
| WO 95/11920 | 9/1995 | (WO) . |

* cited by examiner

*Primary Examiner*—Diego Gutierrez
*Assistant Examiner*—Jeanne-Marguerite Goodwin
(74) *Attorney, Agent, or Firm*—Hopgood, Calimafde Kalil & Judlowe, LLP

(57) ABSTRACT

The invention is directed to a thermopile sensor and in particular to a radiation thermometer or a motion detector with a thermopile sensor. The thermopile sensor includes a thermopile supported in a housing. The thermal capacity of the cold and hot junctions of the thermopile including its supporting structure and the thermal conductivity of the supporting structure are mutually coordinated such that a change in the housing's temperature produces a change of equal magnitude in the cold and hot junctions' temperature, that is, no temperature gradients occur within the thermopile.

17 Claims, 3 Drawing Sheets

THERMOPILE SENSOR FOR RADIATION THERMOMETER OR MOTION DETECTOR

BACKGROUND OF THE INVENTION

This invention relates to a thermopile sensor and in particular to a radiation thermometer or a motion detector with a thermopile sensor.

From U.S. Pat. No. 4,722,612 an infrared thermometer having thermopile devices is known. The thermopile device is mounted on a disk-shaped insulative sheet, with the hot junctions being arranged in the center of the sheet and being surrounded by the cold junctions in the form of a circle. The sheet is stretched across a thermally conductive substrate of toroidal shape, with the thermopile being located on the upper side, and the substrate on the underside, of the sheet. The hot junctions of the thermopile lie in the area of the central aperture of the toroidal substrate, whilst the cold junctions of the thermopile lie in that area of the sheet that is supported by the substrate. As a consequence, in the known thermopile the cold junctions are thermally coupled to the substrate much better than the hot junctions and hence have a thermal capacity exceeding that of the hot junctions by a multiple.

When the known infrared thermometer is used under variable ambient temperature conditions, a temperature difference occurs between the housing of the infrared thermometer and the thermopile sensor, causing the heat radiation of the thermometer housing to superimpose itself upon the heat radiation to be measured, corrupting the measurement result. In addition, a temperature difference then occurs also in the interior of the thermopile sensor because, naturally, first the housing of the thermopile sensor experiences a temperature variation due to thermal conduction and/or convection which then propagates inwardly to the thermopile. For example, when the housing of the thermopile sensor is heated by the housing of the infrared thermometer, the sensor housing heats the air in the interior of the thermopile sensor very rapidly, which however in turn heats only the hot junctions of the thermopile by convection. In the known thermopile sensor the cold junctions are strongly thermally coupled to the substrate which, by virtue of its high thermal capacity, is practically not heated by the air. Naturally, however, also the substrate and with it the cold junctions are heated, but this occurs comparatively slowly by heat conduction from the housing of the thermopile sensor. Therefore, the temperatures of the cold and hot junctions heat at different rates, that is, temperature gradients occur also within the thermopile, introducing errors in the temperature measurement process. To compensate for such errors, the known infrared thermometer includes two thermopile devices of like construction, whereof one is exposed to the radiation to be measured while the other is not, and which are connected in series opposition to each other.

SUMMARY OF THE INVENTION

It is an object of the present invention to provide a thermopile sensor which is insensitive to temperature gradients while yet being of simple construction. It is another object of the present invention to provide a radiation thermometer having a thermopile sensor which is insensitive to ambient temperature variations while equally affording ease of construction.

According to the present invention, these objects are solved in that the thermopile sensor is configured such that the cold and hot junctions of the thermopile heat or cool at the same rate on changes in ambient temperature. This is accomplished in that differences in the thermal capacity (C) between the cold ($C_K$) and hot ($C_K$) junctions disposed on a supporting structure are compensated for by corresponding differences in the thermal insulation (2) of the cold ($\lambda_K$) and the hot ($\lambda_W$) junctions relative to the housing, that is, the ratio of thermal capacity to thermal conductivity in the region of the hot junctions corresponds approximately to the ratio of thermal capacity to thermal conductivity in the region of the cold junctions; that is, $C_K/C_W \approx \lambda_K/\lambda_W$. Therefore, a heat transfer from the sensor housing effects a uniform temperature variation of the cold and hot junctions, preventing temperature gradients from developing within the thermopile which are apt to corrupt the measurement process. The heat transfer between the housing and the thermopile takes place both by thermal conduction along the supporting structure of the thermopile and by convection and radiation. The thermal capacity of the hot and cold junctions is composed of a component determined by the mass and the materials of the respective junction on the one hand, and of a component related to the supporting structure on the other hand.

The thermopile sensor of the present invention has the advantage of obviating the necessity for a complex thermal stabilization by the coupling to isothermal bodies of high thermal capacity, nor does it require elaborate correcting devices in the form of, for instance, a second thermopile connected in series opposition to the first. As a result, this thermopile sensor enables very small and simple probe tips to be constructed, for instance for radiation thermometers for measuring a person's body temperature in the ear. The thermopile sensor of the present invention is also especially suitable for use in radiation thermometers without optical waveguide or with a short optical waveguide or one that is integrally formed with the thermometer housing.

Preferably, the quality of thermal insulation of the cold and hot junctions from the housing of the thermopile sensor is essentially equally good, the junctions exhibiting together with their supporting structure an essentially identical thermal capacity. By symmetrically arranging the cold and hot junctions in respect of the housing, the desired equality of thermal insulation results in a particularly simple manner.

In a preferred aspect of an embodiment of a thermopile sensor of the present invention, the supporting structure includes a membrane of low thermal conductivity with a preferably low thermal capacity, and a frame supporting the membrane. Disposed on the membrane are both the cold and the hot junctions, their location on the membrane being however in an area that is not in contact with the frame. The membrane thus also serves a thermal insulating function between the cold and hot junctions and the housing.

In the thermopile sensor of the present invention, the hot junctions are exposed to the radiation to be measured to a higher degree than the cold junctions, or vice versa. This may be accomplished, for instance, by a diaphragm shielding the cold junctions in the radiation path, or by providing the cold junctions with a heat reflective layer whilst the hot junctions are provided with a heat absorptive layer. In another aspect, the cold and hot junctions are asymmetrically arranged within the housing of the thermopile sensor so that the radiation incident on the sensor through a radiation entrance opening practically reaches only the hot junctions. Preferably, however, the cold and hot junctions are symmetrically arranged within the housing of the thermopile sensor, while the radiation entrance opening is asymmetrical.

A radiation thermometer of the present invention utilizes the thermopile sensor briefly described in the foregoing. The thermopile sensor is arranged in the radiation path of the radiation thermometer such that the hot junctions are exposed to the radiation to be measured to a greater degree than the cold junctions, or vice versa. In a preferred aspect of this embodiment, the radiation thermometer includes means shielding the cold junctions in the radiation path of the radiation thermometer. This may be accomplished by a diaphragm, for example. In other embodiments, the thermopile sensor is asymmetrically arranged in the radiation path of the radiation thermometer.

The invention will be explained in the following with reference to embodiments of thermopile sensors and an infrared thermometer illustrated in the accompanying drawing. Further embodiments and a motion detector are set forth in the description. In the drawing,

DESCRIPTION OF THE INVENTION

Figure 1:
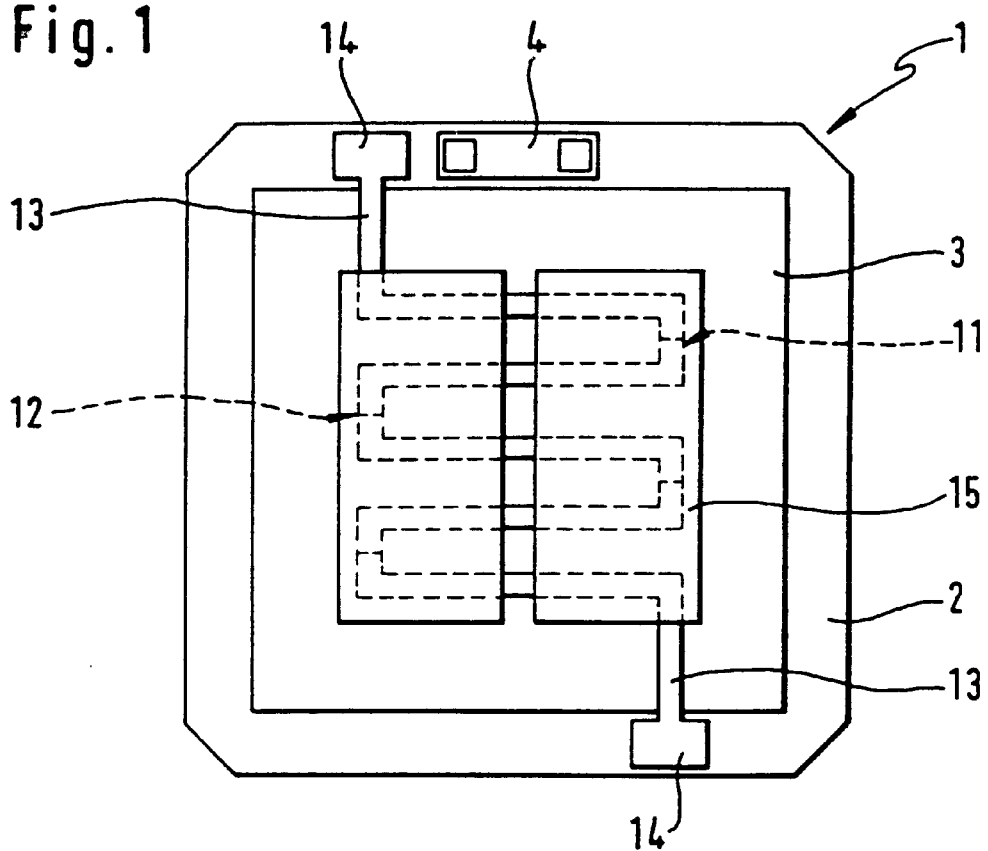
FIG. 1 is a schematic view of a first thermopile sensor element according to the present invention.
Figure 2:
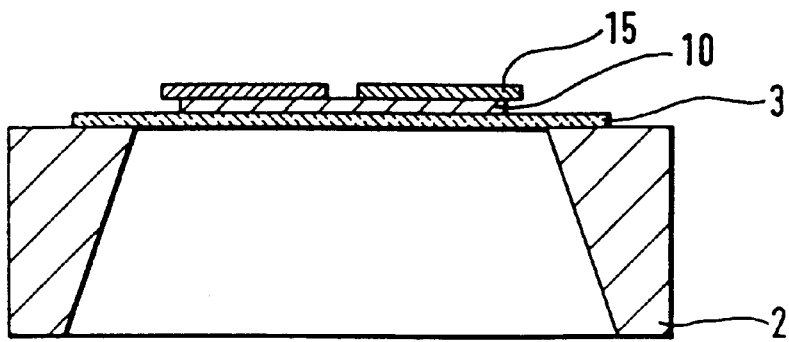
FIG. 2 is cross-sectional view of the sensor element of FIG. 1.

The thermopile sensor element 1 illustrated schematically in FIGS. 1 and 2 includes a frame 2 to which a thin membrane 3 is secured. Mounted on the membrane is a thermopile 10, that is, a group of thermocouples having each one cold junction 11 and one hot junction 12. The cold junctions are spaced from the frame at about the same distance as the hot junctions, with the cold junctions 11 being located on the one half of the membrane 3 and the hot junctions 12 on the other half. At least in the region of the cold and hot junctions the two halves are covered with a respective absorptive layer 15 or a layer conducting heat well, so that the cold junctions 11 are beneath the one, and the hot junctions 12 beneath the other layer. These layers enhance the sensitivity of the sensor element. The thermocouples are electrically connected in series and are connected to terminal points 14 on the frame 2 via two leads 13 of equal length. An ambient temperature sensor 4 is secured to the frame 2 in a manner conducting heat well.

The absorptive layers 15 improve the radiation absorption of the thermopile. In another embodiment of a thermopile sensor element of the present invention, only the hot junctions 12 are covered with an absorptive layer, while in a still further embodiment the hot junctions 12 are covered with an absorptive layer and the cold junctions 11 are covered with a heat reflective layer.

In an embodiment of a thermopile sensor element of the present invention not illustrated in the Figures, the thermocouples are uniformly distributed over practically the entire surface area of the membrane, that is, the hot and cold junctions are arranged side by side in close proximity to each other. This enables a particularly large number of thermocouples to be accommodated on a relatively small membrane, since it enables the connecting conductors between the cold and hot junctions to be of very short length.

The hot junctions are covered with a heat absorptive layer individually, or several juxtaposed hot junctions are covered with a common heat absorptive layer, whilst the cold junctions are covered with a heat reflective layer individually, or several juxtaposed cold junctions are covered with a common heat reflective layer.

The membrane is preferably made of a material which is a poor heat conductor, in addition to having a low thermal capacity. By reason of the symmetrical arrangement of the cold and hot junctions on the membrane, heating of the frame causes uniform heating of the cold and hot junctions due to the albeit low thermal conductivity of the membrane, so that it is solely by virtue of the arrangement of the cold and hot junctions according to the invention that at most very small temperature gradients can occur within the thermocouples of the thermopile.

The membrane 3 is preferably thinner than 1 $\mu$m and is predominantly made of silicon oxide and silicon nitride or silicon oxinitride. The thermocouples are made of polysilicon/aluminum or p-polysilicon/n-polysilicon, for example. The frame 2 is preferably made of silicon. It may therefore serve as substrate for electronic components; for instance, amplifiers for amplifying the signal output from the thermopile may be provided on the frame. Because these amplifiers produce a certain waste heat, they are positioned symmetrically to the thermopile on the frame, thereby preventing them from causing heat gradients in the thermopile.

Figure 3:
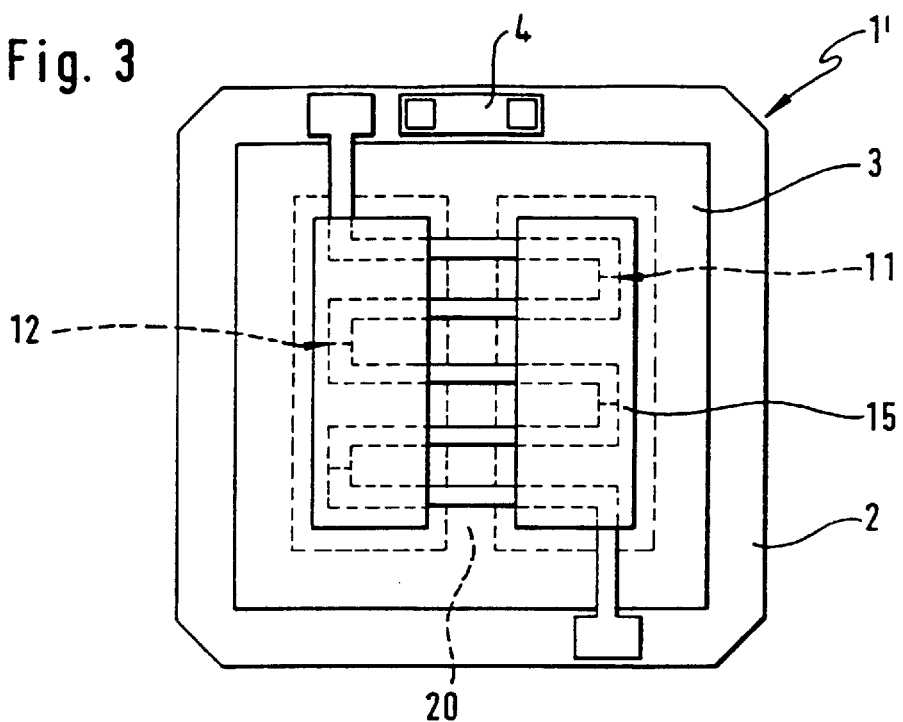
FIG. 3 is a schematic view of a second thermopile sensor element according to the present invention.
Figure 4:
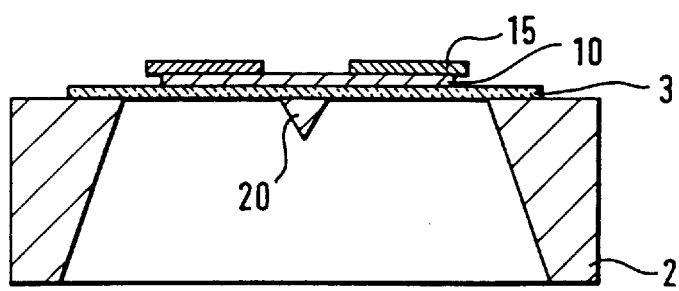
FIG. 4 is a cross-sectional view of the sensor element of FIG. 3.

FIGS. 3 and 4 illustrate schematically another thermopile sensor element 1' of the present invention which differs from the thermopile sensor element 1 illustrated in FIGS. 1 and 2 only by the provision of a rib member 20 disposed beneath the membrane 3 between the cold and hot junctions. In a preferred aspect, the rib member 20 is connected with the frame 2 in a thermally conductive manner or is part of the frame 2. This rib member reduces the amount of thermal conduction between the cold and hot junctions, thereby improving the dynamic response of the sensor. In addition, the rib member 20 contributes to strengthening the mechanical stability of the membrane 3 by supporting it midway.

In another aspect, the cold and/or hot junctions of the thermopile sensor elements described in the foregoing are of larger size than the connecting conductors for enhanced sensitivity.

Figure 5:
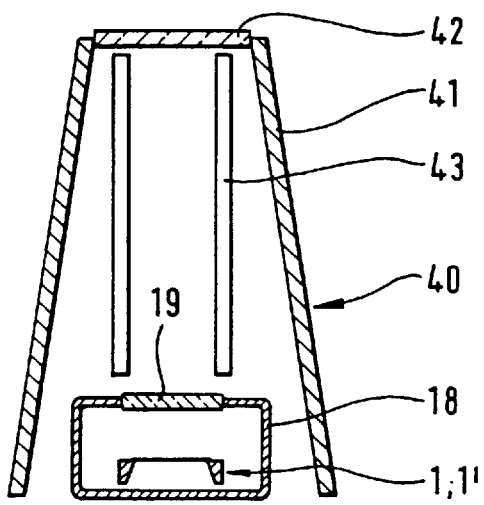
FIG. 5 is a schematic view of an infrared thermometer according to the present invention.

The radiation thermometer 40 illustrated schematically in FIG. 5 includes a housing 41 with a window 42 transparent to radiation from which an optical waveguide 43 extends into the interior of the housing 41 to a thermopile sensor. Particularly advantageously, the optical waveguide 43 reaches directly up to the thermopile sensor so that the latter sees only the waveguide 43. This makes it possible to avoid measurement errors caused by radiation emitted by housing portions that are at a different temperature than the thermopile sensor. Further, the emissivity of the optical waveguide 43 may be reduced by gold-plating it, for example.

The thermopile sensor includes a housing 18 which has a window 19 transparent to radiation and receives in its interior a thermopile sensor element 1, 1'. The radiation to be detected is directed to the thermopile sensor element 1, 1' such that the major part of the radiation impinges on the hot junctions of the thermopile, producing a temperature difference between the hot and cold junctions of the thermopile which generates a corresponding sensor output signal. For this purpose, appropriate means (not shown in FIG. 5) are provided either in or on the thermopile sensor which cover the cold junctions of the thermopile, or alternatively the thermopile sensor element 1, 1' is asymmetrically arranged in the housing 18 behind the window 19, that is, displaced to the side, so that they cannot be reached by the incoming radiation. In another aspect, the thermopile sensor is asymmetrically arranged, that is, displaced to the side at the end of the optical waveguide 43.

Figure 6:
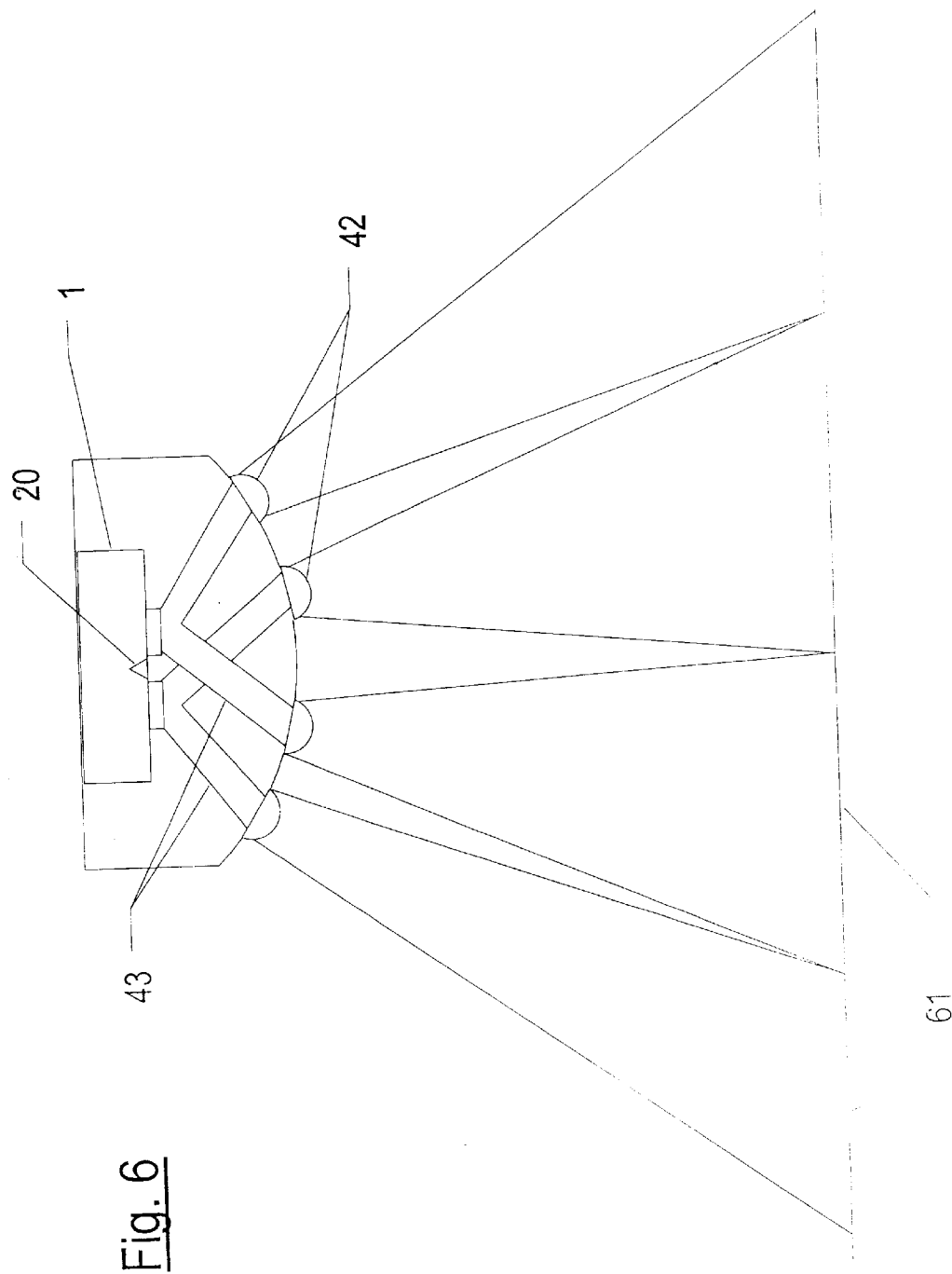
FIG. 6 is an idealized view of a motion detector according to this invention.

Complete symmetry of the radiation path of a radiation thermometer is possible in the use of the thermopile sensor element described in the foregoing, in which the hot junctions are covered with a layer different from that of the cold junctions. Particularly advantageously, the hot junctions are provided with an absorptive layer and the cold junctions with a reflective layer. In the motion detector shown in Fig. 6, the thermopile sensor 1 is provided with diaphragms and/or focusing elements 42 arranged so that an object that moves past the areas 61 focused is detected by the hot and cold junctions of the sensor element alternatively, causing a corresponding sensor output signal to be generated. The basic structure and the mode of function correspond to a motion detector having two serially connected thermopile sensor elements. However, the sensor according to the present invention is simpler and less expensive, and moreover the sensitivity of the two sensor halves is identical.

What is claimed is:

1. A thermopile sensor with a housing, the thermopile sensor having at least two cold junctions and at least two hot junctions, and with a supporting structure for the cold and hot junctions, characterized in that the thermopile and its supporting structure satisfy the relationship $C_K/C_W \approx \lambda_K/\lambda_W$, where $C_K$ is the thermal capacity of the cold junctions (11) and their supporting structure;

$C_W$ is the thermal capacity of the hot junctions (12) and their supporting structure;

$\lambda_K$ is the thermal conductivity in the region of the cold junctions (11); and $\lambda_W$ is the thermal conductivity in the region of the hot junctions (12).

2. The thermopile sensor as claimed in claim 1, characterized in that the quality of thermal insulation of the hot junctions (12) and cold junctions (11) from the housing is essentially equally good, and that said junctions exhibit together with their supporting structure an essentially identical thermal capacity, that is, $\lambda_K \approx \lambda_W$ and $C_K \approx C_W$.

3. The thermopile sensor as claimed in claim 1, characterized in that the supporting structure includes at least one membrane (3) on which the cold and hot junctions are disposed, and that said membrane has a low thermal capacity and a low thermal conductivity.

4. The thermopile sensor as claimed in claim 3, characterized in that the supporting structure further includes a frame (2) supporting the membrane (3), and that the cold and hot junctions are located on the membrane (3) in an area that is not in contact with the frame (2).

5. The thermopile sensor as claimed in claim 4, characterized in that a heat sink (20) is provided between the cold junctions (11) and the hot junctions (12) which is connected to the frame (2) in a thermally conductive manner or is part of the frame (2).

6. The thermopile sensor as claimed in claim 4, characterized in that the membrane (3) is predominantly made of silicon oxide and silicon nitride or silicon oxinitride, and the frame (2) is substantially made of silicon, and that electronic circuits, in particular amplifiers, are disposed on the frame (2).

7. The thermopile sensor as claimed in claim 1, characterized in that a heat absorptive layer or a layer conducting heat well is applied to the hot junctions (12).

8. The thermopile sensor as claimed in claim 1, characterized in that a heat reflective layer is applied to the cold junctions (11).

9. The thermopile sensor as claimed in claim 1, characterized in that the cold and hot junctions are symmetrically arranged in the interior of the housing.

10. The thermopile sensor as claimed in claim 1, characterized in that either the cold and hot junctions or a radiation entrance window are asymmetrically arranged in the housing.

11. The thermopile sensor as claimed in claim 10, characterized in that a heat absorptive layer or a layer conducting heat well is applied to the cold junctions (11).

12. The thermopile sensor as claimed in claim 1, characterized in that an ambient temperature sensor (4) is connected to the supporting structure in a thermally conductive manner.

13. A radiation thermometer with a thermopile sensor as claimed in claim 1.

14. The radiation thermometer as claimed in claim 13, characterized in that the thermopile sensor is so arranged in the radiation path of the radiation thermometer that the hot junctions are exposed to the radiation to be measured to a greater degree than the cold junctions, or vice versa.

15. The radiation thermometer as claimed in claim 14, characterized in that means are provided that cover the cold junctions in the radiation path of the radiation thermometer.

16. The radiation thermometer as claimed in claim 14, characterized in that the thermopile sensor is asymmetrically arranged in the radiation path of the radiation thermometer.

17. A motion detector with at least one thermopile sensor as claimed in claim 1.

\* \* \* \* \*